US012205809B2

(12) United States Patent
Steiner et al.

(10) Patent No.: US 12,205,809 B2
(45) Date of Patent: Jan. 21, 2025

(54) GAS RETAINING ION GUIDE WITH AXIAL ACCELERATION

(71) Applicant: Bruker Switzerland AG, Fäellanden (CH)

(72) Inventors: Urs Steiner, Aarau (CH); Felician Muntean, Andover, MA (US)

( * ) Notice: Subject to any disclaimer, the term of this patent is extended or adjusted under 35 U.S.C. 154(b) by 420 days.

(21) Appl. No.: 17/854,940

(22) Filed: Jun. 30, 2022

(65) Prior Publication Data

US 2024/0006172 A1 Jan. 4, 2024

(51) Int. Cl.
*H01J 49/06* (2006.01)

(52) U.S. Cl.
CPC .................................. *H01J 49/062* (2013.01)

(58) Field of Classification Search
CPC ..................................................... H01J 49/062
See application file for complete search history.

(56) References Cited

U.S. PATENT DOCUMENTS 6,111,250 A 8/2000 Thomson et al.
6,576,897 B1 6/2003 Steiner et al.
7,564,025 B2 7/2009 Crawford
7,675,031 B2 3/2010 Konicek et al.
7,923,681 B2 4/2011 Collings et al.
8,481,929 B2 7/2013 Steiner et al.
2009/0206250 A1 8/2009 Wolnik
2013/0015349 A1 1/2013 Steiner et al.
2018/0122627 A1 5/2018 Guna
2020/0194244 A1 6/2020 Hendricks et al.

*Primary Examiner* — Nicole M Ippolito
*Assistant Examiner* — Hanway Chang
(74) *Attorney, Agent, or Firm* — Benoȋt & Côté, Inc.

(57) ABSTRACT

A gas retaining ion guide has RF electrodes distributed about an ion region that provide an RF confinement field for ions therein. DC electrodes are also provided that extend from an entrance of the ion guide to an exit, and provide a DC electric field. The DC electrodes are further from the central axis than the RF electrodes, and each provides a gas seal between two adjacent RF electrodes. Conductive surfaces of the DC electrodes establish the DC electric field through gaps between adjacent RF electrodes, and the conductive surfaces have a distance from the central axis that changes over the length of the ion guide so as to provide an axial DC field component. The size of the DC electrode conductive surfaces and a width of the gaps between RF electrodes may be selected to ensure that ions escaping confinement through the gaps are discharged on the conductive surfaces.

21 Claims, 4 Drawing Sheets

GAS RETAINING ION GUIDE WITH AXIAL ACCELERATION

BACKGROUND OF THE INVENTION

Field of the Invention

This invention relates generally to the field of mass spectrometry and ion mobility spectrometry and, more specifically, to gas filled ion guides, in particular lens free collision cells for ions.

Description of the Related Art

In analysis systems using mass spectrometry and/or ion mobility spectrometry, it is necessary to ionize a sample material with an ion source and transport the generated ions to an analytical instrument. It is often desirable as well to modify the ions generated in the ion source by fragmenting them into smaller molecular ions. This may be done by introducing the sample ions to a collision cell, in which the sample ions may collide with neutral gas molecules located in the cell. Typically, a specifically selected gas, such as argon, nitrogen, helium, etc., is injected into a higher pressure region of the collision cell, so that the ions will collide with molecules of the injected gas. The resulting fragment or product daughter ions then exit the collision cell and are introduced to an ion analysis instrument.

In such a collision cell, the number of collisions is dependent on the gas pressure and the reaction time, which relates to the collision path length of the cell and ion velocity. The relatively high pressure inside the collision cell must therefore be accurately controlled, while other components of an ion analysis system are often maintained in vacuum. This is particularly true for a "lens-free" collision cell, which forgoes the use of narrow apertures and ion focusing lenses at the entrance and exit of the collision cell. Such a lens-free collision cell is shown in U.S. Pat. No. 8,481,929, the basic configuration of which is shown in FIGS. 1 and 2.

FIG. 1 is a schematic top view showing the above-mentioned collision cell 260 arranged to receive ions output from a mass analyzer 225. After passing through the collision cell 260, the ions are directed to a second mass analyzer 227. As shown, the ions in the collision cell 260 are redirected by 180°, which allows for an overall system to remain compact. The collision cell 260 is formed of four semi-circular conductive elements that provide the required field for the ion transport. The four elements are made of conductive material and are attached to a common insulating plate, so that their alignment is referenced to a single plane. This ensures accurate alignment of the poles during fabrication and at various operating temperatures.

As shown in the cross-section of FIG. 2, taken along line A-A in FIG. 1, each of the electrodes 361-364 of the quad collision cell is made of a conductive semi-circular element, and all four electrodes 361-364 are attached along their length to insulating plate 365. This provides a common reference plane for the electrode surfaces and ensures proper alignment during assembly. Also shown in FIG. 2 are four elongated seals 366, 368, each of which is seated between two adjacent electrodes. The seals 366, 368 are thin insulating strips that follow the shape of the collision cell, providing a tunnel about a path of ion transport that helps to retain the injected gas.

SUMMARY OF THE INVENTION

In accordance with the present invention, a gas retaining ion guide is provided that is similar to prior art guides like that discussed above, but that also provides a means of ion acceleration that is advantageous in numerous applications. In an exemplary embodiment of the invention, the gas retaining ion guide has a plurality of RF electrodes that extend from an entrance to an exit of the ion guide. The RF electrodes are distributed about a central axis of an ion region of the guide at different respective angular positions relative to a central axis such that, when different phases, most often opposite phases, of a predetermined RF voltage are applied to adjacent electrodes, an RF electric field is generated that provides containment of ions in the ion region.

The gas retaining ion guide also includes a plurality of DC electrodes that extend from the entrance to the exit of the ion guide. The DC electrodes are distributed about the ion region at angular positions relative to the central axis that lie between the angular positions of the RF electrodes. Each DC electrode consists of a conductive surface and insulator making mechanical contact with adjacent electrode support structures so as to provide a gas seal that inhibits gas flow out of the ion region in a radial direction. In order to provide an axial DC electric field component, at least some of the conductive surfaces of the DC electrodes have a radial distance from the central axis that changes between the entrance and exit of the ion guide.

In the exemplary embodiment, a common DC voltage is applied to each of the conductive surfaces, and the changing distance of the conductive surfaces from the central axis is the source of the axial DC electric field component. In one version of this embodiment, two of the DC electrodes on opposite sides of the central axis have conductive surfaces with a radial distance from the central axis that either increases or decreases from the entrance to the exit of the ion guide. This change introduces an axial DC electric field component that accelerates ions in the ion region in the direction of the exit of the ion guide. For this purpose, a DC voltage applied to the conductive surfaces of the DC electrodes may have a polarity that is either repelling or attracting to the ions contained in the ion guide, respectively, depending on whether the radial distance of the DC electrodes increases or decreases from the entrance to the exit of the guide.

In the exemplary embodiment, the DC electrodes are mounted between opposing slots in conductive material of adjacent RF electrodes. In this embodiment, the conductive surfaces of the DC electrodes are further from the central axis than RF field generating surfaces of the RF electrodes that contribute to the RF electric field in the ion region. Each of the DC electrodes has a substantially oblong cross-sectional profile in a plane perpendicular to the central axis, and the conductive surface of each DC electrode is perpendicular to a radial direction relative to the central axis. The RF field generating surfaces of two adjacent RF electrodes are separated by a gap that lies between the central axis and the conductive surface of a proximate one of the DC electrodes. Thus, the DC electric field is established between opposing DC electrodes through the gaps between adjacent RF electrodes.

The gap between adjacent RF electrodes may be a constant width from the entrance to the exit, and the conductive surface of the proximate DC electrodes may be made wider than the gap. In particular, the size of the conductive surface is sufficient that it is intersected by any straight-line trajectory from the ion region that passes through the gap. This ensures that any ion that escapes containment and follows a straight-line path through the gap will be discharged on the conductive surface of the DC electrode. The conductive surfaces of the DC electrodes also have a minimum distance from any conductive surface of an RF electrode that is sufficient to prevent electrical arcing. In the exemplary embodiment, each DC electrode has an insulating substrate on which its conductive surface is located, and the conductive surface covers only a portion of the substrate, which prevents electrical contact with conductive material of adjacent RF electrodes.

In various embodiments of the gas retaining ion guide, a number of DC electrodes may be such that gas seal is provided between each two adjacent RF electrodes so that gas flow out of the ion region in all radial directions is inhibited. Such design may give rise to the use of the gas retaining ion guide as an ion collision cell. Such ion collision cell may further comprise a gas inlet located between the entrance and exit of the gas retaining ion guide, through which a collision gas is supplied to the ion region during operation.

DETAILED DESCRIPTION

Figure 1:
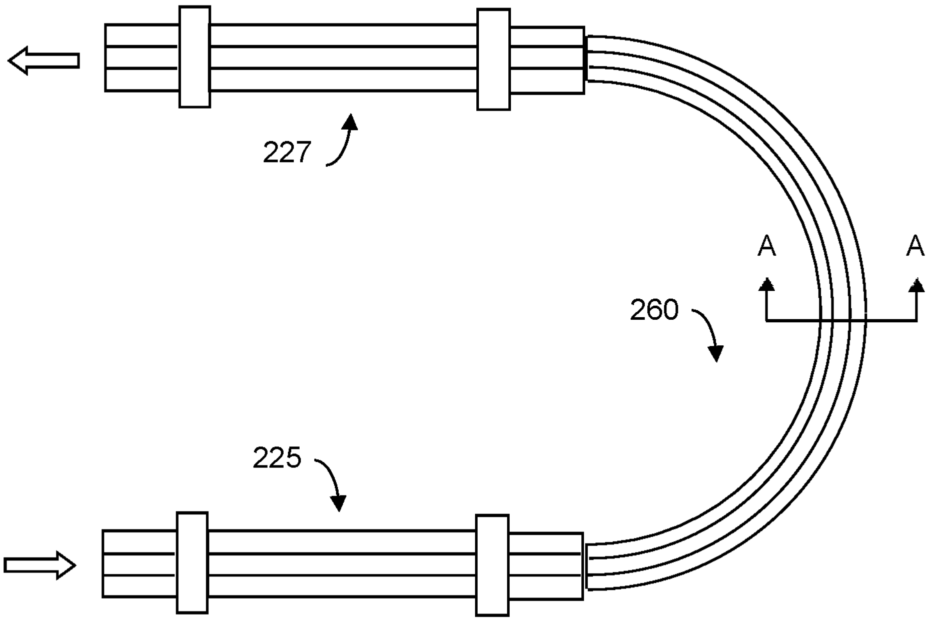
FIG. 1 PRIOR ART
FIG. 1 is a schematic top view of a collision cell according to the prior art together with two mass analyzers.
Figure 2:
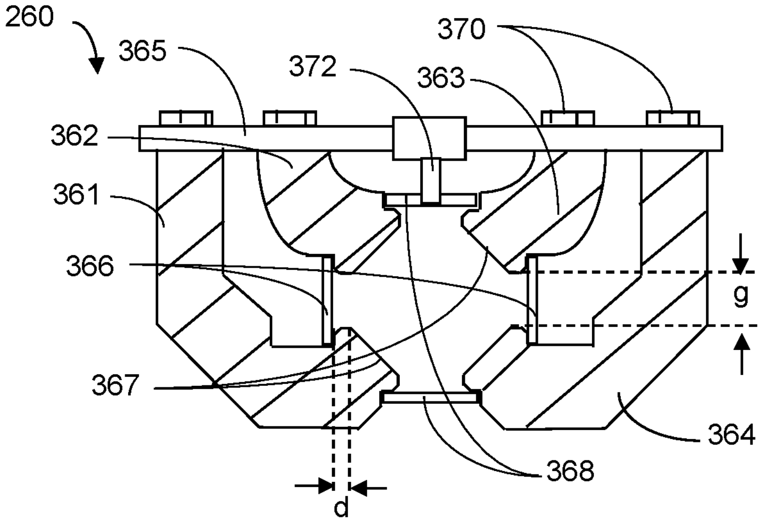
FIG. 2 PRIOR ART
FIG. 2 is a schematic cross-sectional view of the collision cell shown in FIG. 1.
Figure 3:
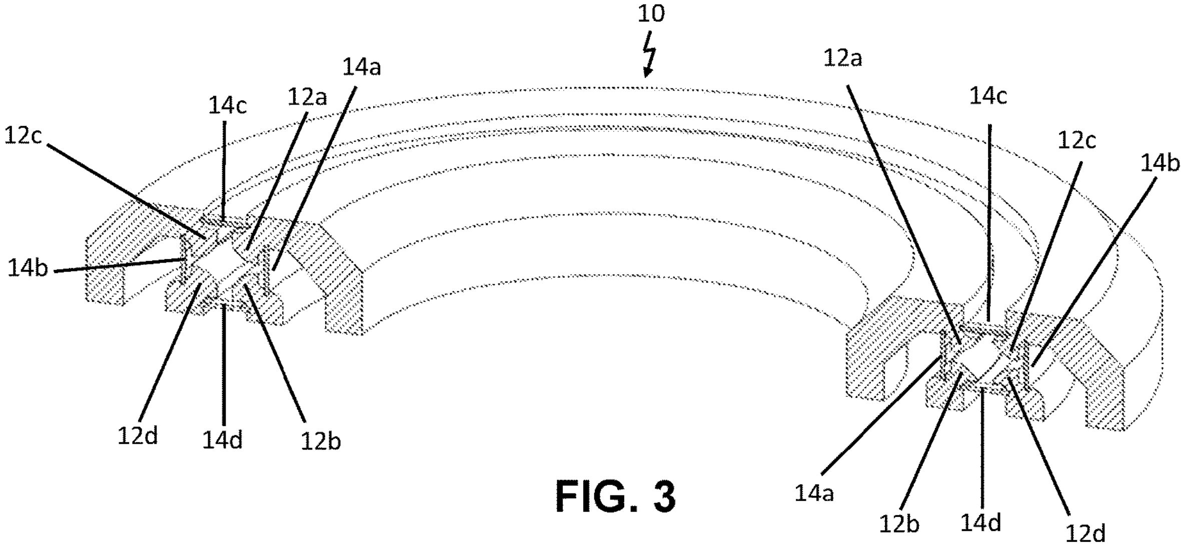
FIG. 3 is a schematic perspective view of a collision cell according to the invention.

Shown schematically in FIG. 3 is a gas retaining ion guide according to the present invention taking the form of a lens-free collision cell. The collision cell is of a similar design to the prior art collision cell shown in FIGS. 1 and 2 in that it includes four electrodes 12*a*, 12*b*, 12*c* and 12*d* (referred to collectively herein as the "electrodes 12") in a quadrupolar arrangement that follows a semi-circular path. Each of the electrodes 12 is attached along its length to a single insulating plate 16 (shown in FIGS. 5A and 5B), which provides a common reference plane for the alignment of electrode surfaces. The collision cell 10 also includes four acceleration blade electrodes 14*a*, 14*b*, 14*c* and 14*d*, which are referred to herein for brevity as simply "blades" (and identified collectively using reference numeral 14), each of which is held in a respective mounting location between two of the structures that form electrodes 12. Each of the blades 14 has an oblong cross-sectional profile that, for blades 14*a* and 14*b*, is oriented with its long dimension parallel to a "vertical" direction and, for blades 14*c* and 14*d*, is oriented with its long dimension parallel to a "horizontal" direction perpendicular to the "vertical" direction. For ease of description, blades 14*a*, 14*b* are therefore referred to herein as "vertical" blades and blades 14*c*, 14*d* are referred to herein as "horizontal" blades, although those skilled in the art will understand that the references to "vertical" and "horizontal" do not imply any absolute positioning of the blades, and that the collision cell may be operated in any orientation.

Like the insulating seals of the prior art, each of the blades 14 provides a gas seal in its space between the electrodes to which it is mounted. However, each of the blades 14 also carries a DC voltage potential, and the relative positioning of the blades is used to provide an axial acceleration to the ions in the collision cell. The axial acceleration can be used to compensate for velocity changes due to gas molecule collisions, or to make other velocity adjustments that may be desired for a particular application.

Figure 4A:
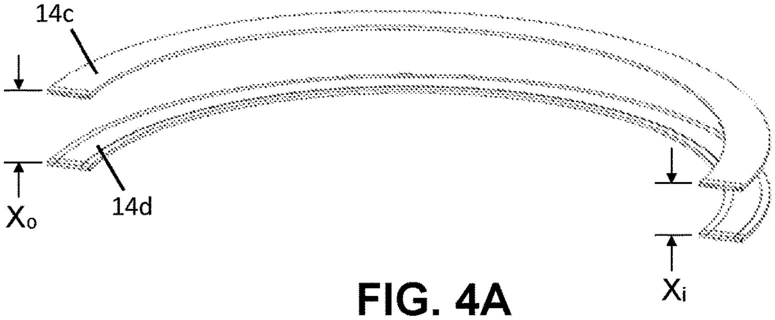
FIG. 4A is an isolated perspective view of acceleration blades used with the collision cell of FIG. 3.
Figure 4B:
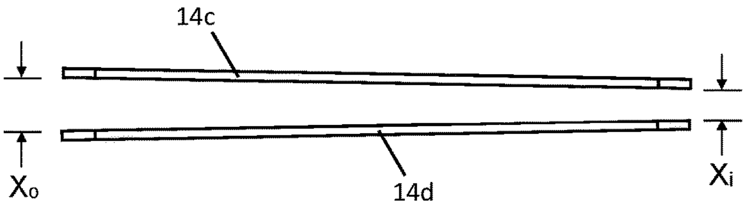
FIG. 4B is an isolated front view of the acceleration blades shown in FIG. 4A.

In the embodiment of FIG. 3, the position of vertical blades 14*a*, 14*b* relative to a central axis of the quadrupole channel remains the same along the entire length of the collision cell. However, the distance of each of the horizontal blades 14*c*, 14*d* from the axis increases from the entrance to the exit of the cell. This is shown more clearly in the isolated perspective view of FIG. 4A and the isolated front view of FIG. 4B, each of which shows schematically that there is a gradually increasing separation between blades 14*c* and 14*d* along the length of the collision cell, from a separation of $X_i$ at the entrance to a separation of $X_o$ at the exit. In the present embodiment, the change in the separation is not linear, but linear or other rates of change can also be used, as can more complex formulas for the blade separation over the length of the cell. Those skilled in the art will understand that while, in the present embodiment, only the horizontal blades change position relative to the central axis along the length of the cell, the relative positions of both the horizontal and the vertical blades could change along the cell length to provide, for example, a stronger field effect.

In the example shown in the figures, the DC potential is repelling relative to the polarity of the ions, which provides the desired ion acceleration toward the exit of the collision cell. However, the invention might use, alternatively, a gradually decreasing separation between the blades 14*c* and 14*d* from the separation $X_i$ at the entrance to the separation $X_o$ at the exit, together with a polarity of the DC voltage potential that is attracting to the ions in the ion region, which will similarly provide ion acceleration in the direction of the collision cell exit.

Figure 5A:
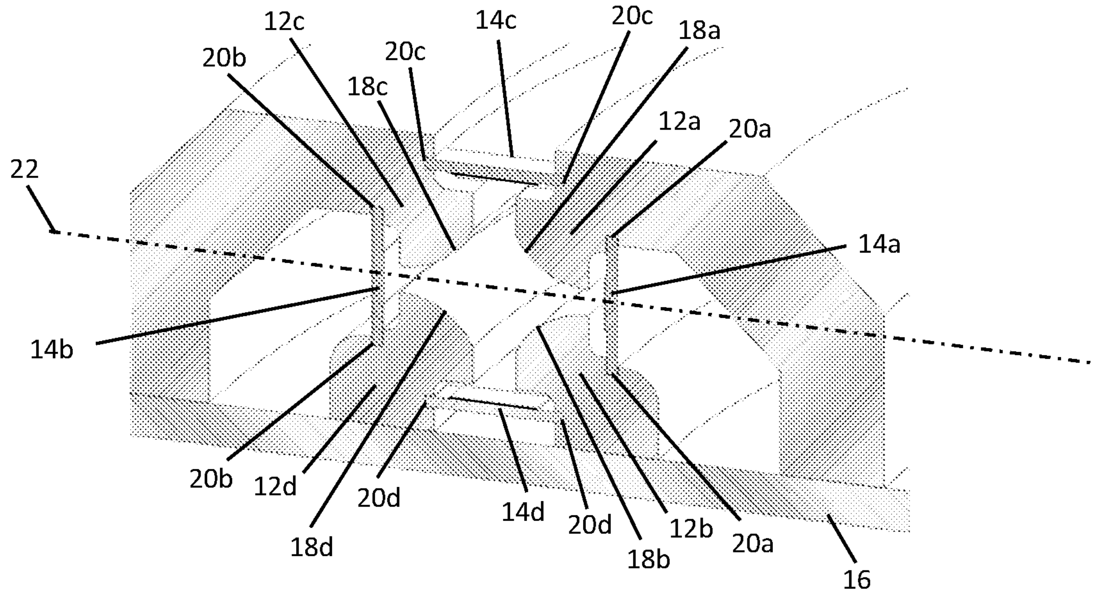
FIG. 5A is a schematic perspective view of the exit of the collision cell of FIG. 3.

FIG. 5A is an enlarged view of an exit region of the collision cell 10 of FIG. 3. As shown, the horizontal blades 14*c* and 14*d* are equally spaced from a central axis of the collision cell, and have a separation from each other that is similar to the separation between vertical blades 14*a* and 14*b*. However, the separation between horizontal blades 14*c* and 14*d* is significantly smaller at the entrance of the collision cell 10, which is shown in the enlarged view of FIG. 5B. As discussed further below, this change in relative separation between the blades 14*c*, 14*d* is provided by the overall structure of the collision cell.

The present embodiment uses a quadrupole RF configuration and, as in the prior art, adjacent electrodes 12 are therefore supplied with the opposite phases of an RF voltage, which confines the ions to the quadrupole channel as known in the art. This embodiment is also similar to the prior art in that the electrodes run parallel to each other and have a constant distance to the quad central axis. The blades 14 are each supplied with the same DC voltage. Thus, for vertical blades 14*a*, 14*b*, which maintain an equal separation along the length of the collision cell 10, a balanced radial DC electric field contribution is generated that has no axial component. For the horizontal blades 14*c*, 14*d*, however, the outwardly tapering separation between the blades introduces an axial component to its DC electric field contribution that produces a force on the ions in the direction of the collision cell exit.

Because of the sensitivity of the ions in the collision cell to both the RF voltage potentials on the electrodes 12 and the DC voltages on the blades 14, the components are carefully arranged relative to each other. Although RF electrodes having different cross-sectional shapes are known in the art, the present embodiment uses electrodes 12 with rounded surfaces 18 facing the ion channel. The rounded surfaces may be more desirable, as they tend to provide containment for a higher range of ion mass values (i.e., m/z values) than flat surfaces or other shapes. However, other electrode shapes may be used as well.

The electrodes 12 are each machined from a conductive metal, with the curved electrode surfaces 18*a*-18*d* being rotationally symmetric about the central axis of the collision cell so that an effective quadrupolar field is formed when the RF voltage is applied. As is known in the art, a first phase of the RF voltage is applied to electrodes 12*a* and 12*d*, while a second different phase, such as the opposite phase, is applied to electrodes 12*b* and 12*c*. The blades 14 are located further from the axis than the electrode heads, and are each mounted in opposing slots 20 between two adjacent RF electrode structures. To distinguish between the different slots herein, the slots that retain blade 14*a* are referred to as slots 20*a*, the slots that retain blade 14*b* are referred to as slots 20*b*, the slots that retain blade 14*c* are referred to as slots 14*c*, and the slots that retain blade 14*d* are referred to as slots 20*d*. Since the relative separation of the vertical blades 14*a*, 14*b* does not change over the length of the collision cell, the positions of the slots 20*a*, 20*b* relative to the central axis of the collision cell is constant over the length of the cell. For the horizontal blades 14*c*, 14*d*, however, the slots 20*c*, 20*d* in which these blades are mounted have a distance from the central axis that changes along the length of the collision cell.

Figure 5B:
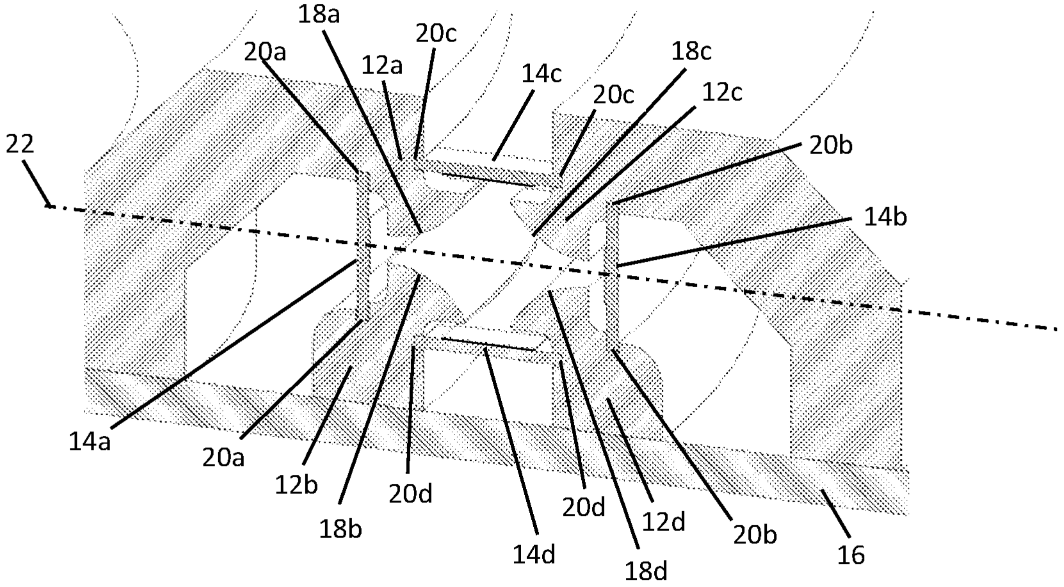
FIG. 5B is a schematic perspective view of the entrance of the collision cell of FIG. 3.

FIGS. 5A and 5B show a "horizontal" radial line 22 that intersects the central axis of the collision cell and is perpendicular to the long cross-sectional dimension of the vertical blades 14*a*, 14*b*. A plane in which both line 22 and the central axis of the collision cell reside is referred to herein as the "central horizontal plane" of the collision cell. Both vertical blades 14*a*, 14*b* follow the curvature of the collision cell, but remain perpendicular to the central horizontal plane along their entire length. The horizontal blades 14*c*, 14*d* also follow the curvature of the collision cell, but each has a distance from the central horizontal plane that increases from the entrance to the exit of the collision cell. To provide this change, slots 20*c*, 20*d* each have a distance to the central horizontal plane that also increases along the length of the collision cell. To maintain a symmetrical cross-sectional profile, the distance of slot 20*c* to the central horizontal plane is the same as the distance of slot 20*d* to the horizontal plane at any point along the length of the cell. Thus, the relative separation between the horizontal blades 14*c*, 14*d* changes at twice the rate of change of the distance of the slots 20*c*, 20*d* to the central horizontal plane.

Figure 6A:
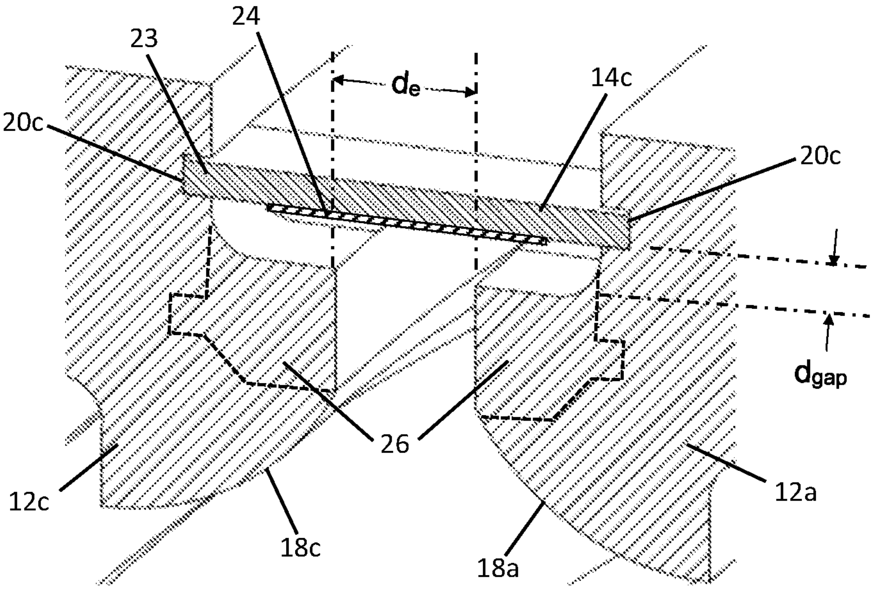
FIG. 6A is an enlarged perspective view of a region of the collision cell exit of FIG. 5A.
Figure 6B:
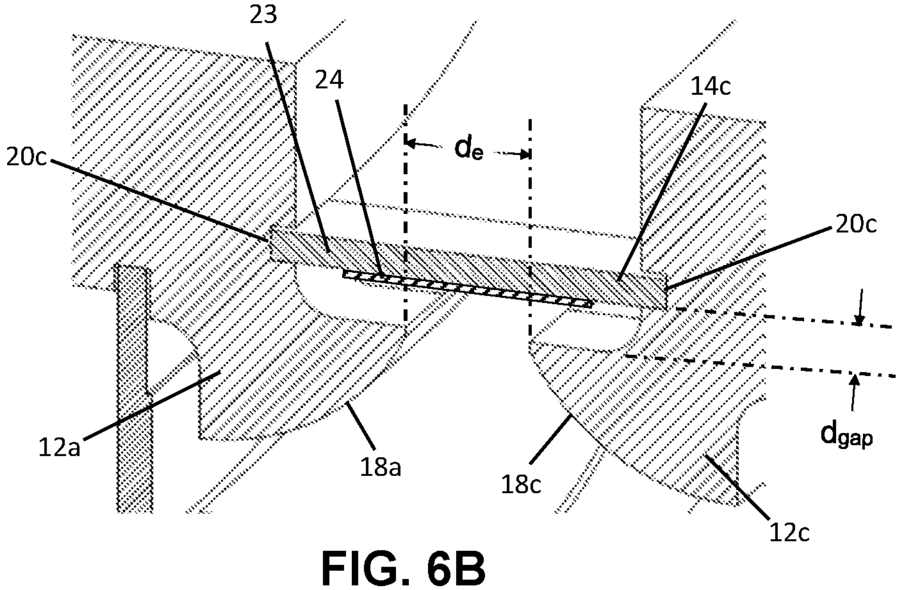
FIG. 6B is an enlarged perspective view of a region of the collision cell entrance of FIG. 5B.

To provide the changing distance of the slots 20*c*, 20*d* to the central horizontal plane, the position of those slots in the electrode material changes over the length of the collision cell, and the shape of the material accommodates those changes. FIGS. 6A and 6B show an enlargement of the regions of FIGS. 5A and 5B, respectively, that contain the blade 14*c*. In FIG. 6B, which shows the entrance of the collision cell, the position of blade 14*c* is at its closest proximity to the central horizontal plane. As such, the slots 20*c* are directly adjacent to the curved surfaces 18*a* and 18*c* of electrodes 12*a* and 12*c*, respectively. However, at the exit of the collision cell, as shown in FIG. 6A, the blade 14*c* and the slots 20*c* are much further from the curved surfaces 18*a* and 18*c* of electrodes 12*a* and 12*c*. In this region, there is significantly more metal material on the portions of electrode structures 12*a*, 12*c* lying between the curved surfaces of those electrodes and the blade 14*c*. It will be understood that, while FIGS. 6A and 6B show only the section of the collision cell surrounding blade 14*c*, the region surrounding blade 14*d* has the same characteristics, albeit in an opposite orientation.

Although the blades 14 may use different specific types of construction, in the present embodiment each blade consists of a non-conductive substrate 23 on which is located a conductive trace 24 that covers a portion of one side of the blade from the entrance to the exit of the collision cell. The structure of the blades 14 may be similar to that of printed circuit board technologies, and similar manufacturing processes can be used to produce them. As the blades are relatively thin, a sufficiently flexible substrate material may be used that adapts easily to the change in position relative to the central horizontal plane over the length of the collision cell. As shown in the figures, the non-conductive substrate fits within the slots 20 to maintain the blade at the desired position and orientation and is retained thereby to preserve the desired relative positioning of the components. The conductive portion 24 of each blade does not make contact with any of the conductive material of the electrodes 12, and it is positioned at a distance from any other conductive surface such that, given the voltages used in the embodiment, no risk of arcing exists.

To allow the DC field generated by the blades 14*c*, 14*d* to penetrate sufficiently into the ion region of the collision cell, a spacing $d_e$ is maintained between the electrode structures. The spacing $d_e$ must be sufficiently large that the electric potential created by the blades on the central axis would be on the order of a few percent of the DC voltage applied on the blades. The conductive surface 24 of the blade 14*c* faces the electrode space in order to provide the desired DC electric field components together with blade 14*d*. The presence of this conductive surface also provides a discharge location for any ions that might escape confinement through the space $d_e$. In general, it is undesirable to have non-conductive surfaces exposed to ions that escape confinement, as this might lead to charge buildup over time that degrades the performance of the collision cell. As shown FIGS. 6A and 6B, the conductive surface 24 of the blade 14*c* extends beyond the vertical limits of the space $d_e$, as possible ion trajectories exist that would result in the ion contacting the blade 14*c* at a horizontal position outside of the vertical area defined by spacing $d_e$. As such, by extending the conductive surface 24 into those regions, there is no non-conductive surface that can be reached on the blade 14*c* by an errant ion.

As mentioned above, a spacing between the conductive surface 24 of the blade 14*c* and the conductive material of the electrodes 12*a*, 12*c* must be large enough in light of the RF and DC voltages used to avoid any arcing between the conductive surface 24 and the electrode material. In the present embodiment, a gap between the blade 14*c* and a back side of the electrodes 12*a* and 12*c* is maintained at an approximately constant distance, $d_{gap}$, over the length of the collision cell, which requires a change in the cross-sectional profile of the electrode material from the entrance of the cell to the exit. In FIG. 6A, dashed lines are used to show regions 26 of the electrode material that are present at the exit of the collision cell but that are not present at the entrance. To keep the distance $d_{gap}$ constant, it will be recognized that these regions 26 are gradually reduced in the direction of the collision cell exit. By doing so, and keeping $d_{gap}$ constant, there are no non-conductive surfaces exposed to ions, which would otherwise be the case if, for example, the conductive material in regions 26 was not present at the collision cell exit shown in FIG. 6A. By adjusting the amount of material in these regions over the length of the collision cell, errant ions will contact those conductive surfaces and be discharged. Again, although FIGS. 6A and 6B show only the region surrounding blade 14*c*, the same principles apply for the regions surrounding blade 14*d*, including the reduction over the length of the collision cell of a portion of the conductive material of electrodes 18*b* and 18*d* in the vicinity of the blade 14*d*.

Although the extension of the conductive surface 24 beyond the spacing $d_e$ helps to prevent charge buildup, it results in a portion of the conductive surface 24 being positioned opposite the conductive electrode material, which forms a capacitive structure across part of the gap $d_{gap}$. The resulting capacitance is undesirable but, in the present embodiment, is considered acceptable relative to the voltages used in the collision cell. In general, the capacitance that would be created by the overlap of conductive surfaces may be determined in advance, and the relative surface overlap reduced to a level necessary for the specific application, while otherwise retaining the surface overlap to minimize charge buildup.

Depending on the specific application and demands of the system in which the cell is being used, the specific dimensions may vary. Moreover, even for a given set of performance requirements, different parameters may be varied while still satisfying those requirements. One example of a collision cell uses the following specifications: $d_e$=1.5-3.0 mm; $d_{gap}$=0.5-1.5 mm; $V_{RF}\approx 1000$ V peak-to-peak; and a DC voltage on the blades of $V_{DC}$=20-100V. It will be understood, however, that many different arrangements may be used while still adhering to the principles of the invention.

Although the foregoing example is for a typical 180° collision cell path, it is also possible to use the principles described herein for other shapes, such as one with a 90° curvature. The RF electrodes may also have different shapes and the manner in which the blades are held in place may vary. Other multipoles, such as hexapoles or octopoles, could also be used in place of the quadrupole structure shown. In the exemplary embodiment, the electrode structures are created by precise machining of the conductive electrode material, and the slots 20*c*, 20*d* provide a change in relative separation between the blades 14*c*, 14*d* that provides a desired change in the axial DC electric field component generated along the axis of the collision cell. However, in an alternative embodiment, the slots may be machined into the electrode material according to a desired function that results in an axial component that is non-linear, or that changes in some other customized way along the length of the cell. It is also possible that one or more of the components of the cell could be created using a 3D printing type of technology in which part or all of the structure is constructed layer by layer. Such a build could be done with a combination of conductive and non-conductive material. Alternatively, it could use only non-conductive materials, and be followed by a metalization step that added the necessary metal layers.

While the examples herein are directed to an acceleration in the direction of ion travel, it will be understood that the invention applies equally to a system in which the acceleration is opposed to the direction of ion travel. Such a system could use, for example, a DC potential that is repellant relative to the polarity of the ions with at least one set of opposing blades that have a decreasing separation from the entrance to the exit of the ion guide, or a DC potential that is attractive relative to the polarity of the ions with blades that have an increasing separation from the entrance to the exit. The invention can also be implemented using more than two blades that have a changing relative separation over the length of the ion guide, as mentioned above.

The present invention provides a compact gas retaining ion guide, such as a gastight collision cell, that provides axial acceleration as desired to ions traveling through the guide/cell while using minimal electrical components. The system is low cost, robust, clean and easy to manufacture. Moreover, using a gradient that is simply machined into the mechanical structure, the system is very reproducible for higher volume production, and adjustment of the gradient magnitude can be done via a single DC potential.

The invention claimed is:

1. A gas retaining ion guide comprising:

a plurality of RF electrodes that extend from an entrance to an exit of the ion guide and are distributed about an ion region of the ion guide at different respective angular positions relative to a central axis such that, when different phases of a predetermined RF voltage are applied to adjacent RF electrodes, an RF electric field is generated that provides containment of ions in the ion region; and a plurality of DC electrodes that extend from the entrance to the exit of the ion guide and are distributed about the ion region at angular positions relative to the central axis that lie between the angular positions of the RF electrodes, each DC electrode having a conductive surface and providing a gas seal between two adjacent RF electrodes that inhibits gas flow out of the ion region in a radial direction, wherein at least some of the conductive surfaces of the DC electrodes have a radial distance from the central axis that changes between the entrance and exit of the ion guide.

2. The gas retaining ion guide of claim 1 wherein a common DC voltage is applied to each of the conductive surfaces of the DC electrodes.

3. The gas retaining ion guide of claim 1 wherein two of the DC electrodes on opposite sides of the central axis have conductive surfaces with a radial distance from the central axis that one of increases and decreases from the entrance to the exit of the ion guide.

4. The gas retaining ion guide of claim 3 wherein a DC voltage applied to the conductive surfaces of the DC electrodes has a polarity that is one of repelling and attracting to the ions in the ion guide, respectively.

5. The gas retaining ion guide of claim 1 wherein the DC electrodes are mounted between opposing slots in conductive material of adjacent RF electrodes.

6. The gas retaining ion guide of claim 1 wherein the conductive surfaces of the DC electrodes are further from the central axis than RF field generating surfaces of RF electrodes that contribute to the RF electric field in the ion region.

7. The gas retaining ion guide of claim 6 wherein each of the DC electrodes has a substantially oblong cross-sectional profile in a plane perpendicular to the central axis, and wherein the conductive surface of each DC electrode is perpendicular to a radial direction relative to the central axis.

8. The gas retaining ion guide of claim 7 wherein the RF field generating surfaces of two adjacent RF electrodes are separated by a gap that lies between the central axis and the conductive surface of a proximate one of the DC electrodes.

9. The gas retaining ion guide of claim 8 wherein the size of said predetermined gap is constant from the entrance to the exit.

10. The gas retaining ion guide of claim 8 wherein the size of the conductive surface of said proximate DC electrode is sufficient that it is intersected by any straight-line trajectory from the ion region that passes through the gap.

11. The gas retaining ion guide of claim 1 wherein the conductive surfaces of the DC electrodes have a minimum distance from any conductive surface of an RF electrode that is sufficient to prevent electrical arcing.

12. The gas retaining ion guide of claim 1 wherein each DC electrode comprises an insulating substrate on which its conductive surface is located.

13. The gas retaining ion guide of claim 12 wherein the conductive surface of each DC electrode covers only a portion of the substrate, and the substrate makes contact with conductive material of adjacent RF electrodes.

14. The gas retaining ion guide of claim 1 wherein a number of DC electrodes is such that a gas seal is provided between each two adjacent RF electrodes so that gas flow out of the ion region in all radial directions is inhibited.

15. An ion collision cell comprising the gas retaining ion guide of claim 14.

16. The ion collision cell of claim 15, further comprising a gas inlet located between the entrance and exit of the gas retaining ion guide, through which a collision gas is supplied to the ion region during operation.

17. A method of accelerating ions in a gas retaining ion guide comprising a plurality of RF electrodes that extend from an entrance to an exit of the ion guide and are distributed about an ion region of the ion guide at different respective angular positions relative to a central axis such that, when different phases of a predetermined RF voltage are applied to adjacent RF electrodes, an RF electric field is generated that provides containment of ions in the ion region, the method comprising locating a plurality of DC electrodes in the ion guide that extend from the entrance to the exit of the ion guide and that are distributed about the ion region at angular positions relative to the central axis that lie between the angular positions of the RF electrodes, each DC electrode having a conductive surface and providing a gas seal between two adjacent RF electrodes that inhibits gas flow out of the ion region in a radial direction, wherein at least some of the conductive surfaces of the DC electrodes have a radial distance from the central axis that changes between the entrance and exit of the ion guide.

18. The method according to claim 17 wherein locating a plurality of DC electrodes in the ion guide comprises locating two of the DC electrodes on opposite sides of the central axis that have conductive surfaces with a radial distance from the central axis that one of increases and decreases from the entrance to the exit of the ion guide.

19. The method according to claim 17 wherein locating a plurality of DC electrodes in the ion guide comprises mounting the DC electrodes between opposing slots in conductive material of adjacent RF electrodes.

20. The method according to claim 17 wherein each DC electrode comprises an insulating substrate on which its conductive surface is located, the insulating substrate making contact with conductive material of adjacent RF electrodes.

21. The method according to claim 17 wherein locating a plurality of DC electrodes in the ion guide comprises locating a number of DC electrodes in the ion guide that is sufficient to provide a gas seal between each two adjacent RF electrodes so that gas flow out of the ion region in all radial directions is inhibited.

* * * * *